United States Patent [19]
Schütte et al.

[11] Patent Number: 5,478,544
[45] Date of Patent: Dec. 26, 1995

[54] METHOD FOR PRODUCING SODIUM PERBORATE MONOHYDRATE

[75] Inventors: Rüdiger Schütte, Alzenau-Hörstein; Alexander Ruhs, Rheinfelden; Claas-Jürgen Klasen, Rodenbach; Hans-Christian Alt, Gelnhausen, all of Germany

[73] Assignee: Degussa Aktiengesellschaft, Hanau, Germany

[21] Appl. No.: 487,477

[22] Filed: Jun. 7, 1995

Related U.S. Application Data

[63] Continuation of Ser. No. 240,317, May 10, 1994, abandoned.

[30] Foreign Application Priority Data

May 15, 1993 [DE] Germany .......................... 43 16 320.3

[51] Int. Cl.$^6$ ................................................ C01B 15/12
[52] U.S. Cl. ...................... 423/279; 23/313 FB
[58] Field of Search ................ 423/279; 23/313 FB

[56] References Cited

U.S. PATENT DOCUMENTS

| | | | |
|---|---|---|---|
| 3,914,380 | 10/1975 | Dillenburg et al. | 423/279 |
| 4,942,025 | 7/1990 | Condo et al. | 423/279 |
| 5,104,631 | 4/1992 | Reginato | 423/279 |
| 5,229,092 | 7/1993 | Dugua | 423/279 |

FOREIGN PATENT DOCUMENTS

| | | | |
|---|---|---|---|
| 1081421 | 12/1954 | France . | |
| 2417470 | 10/1979 | France | 423/279 |
| 0194952B2 | 1/1992 | France . | |
| 2444780 | 4/1976 | Germany . | |
| 2258319C3 | 4/1978 | Germany . | |
| 1930286C3 | 5/1980 | Germany . | |
| 549298 | 11/1942 | United Kingdom . | |
| 1202670 | 8/1970 | United Kingdom | 423/279 |

OTHER PUBLICATIONS

John H. Perry, *Chemical Engineers' Handbook*, Fourth Edition, McGraw-Hill Book Co. (1963), pp. 20–50 through 20–53.

Brochure of Sulzer Escher Wyss "Fliessbett-Technik" p. 10.

DIN ISO 3310 concerning seiving specimens subsequent to ball milling on cover of ISO 3310 and discussed on p. 15 of the application.

"Sodium perborates for industrial use–Determination of degree of attrition", International Standard ISO 5937, International Organization for Standardization, Nov. 1, 1980.

*Primary Examiner*—Wayne Langel
*Attorney, Agent, or Firm*—Beveridge, DeGrandi, Weilacher & Young

[57] ABSTRACT

Method and apparatus for producing sodium perborate monohydrate by dehydrating sodium perborate tetrahydrate in a fluid bed with heated air. Contact surfaces are arranged inside the fluid bed whose total area is the same as up to 500 times the area of the approach-flow bottom of the fluid bed. The contact surfaces are advantageously designed as heat exchangers whose surface temperature is adjusted to maintain 90° to 110° C. at the contact surfaces. The method results in a sodium perborate monohydrate with especially high abrasion resistance. In addition, the energy requirement is lower than that provided in the previously known method commonly used in the industry.

20 Claims, 1 Drawing Sheet

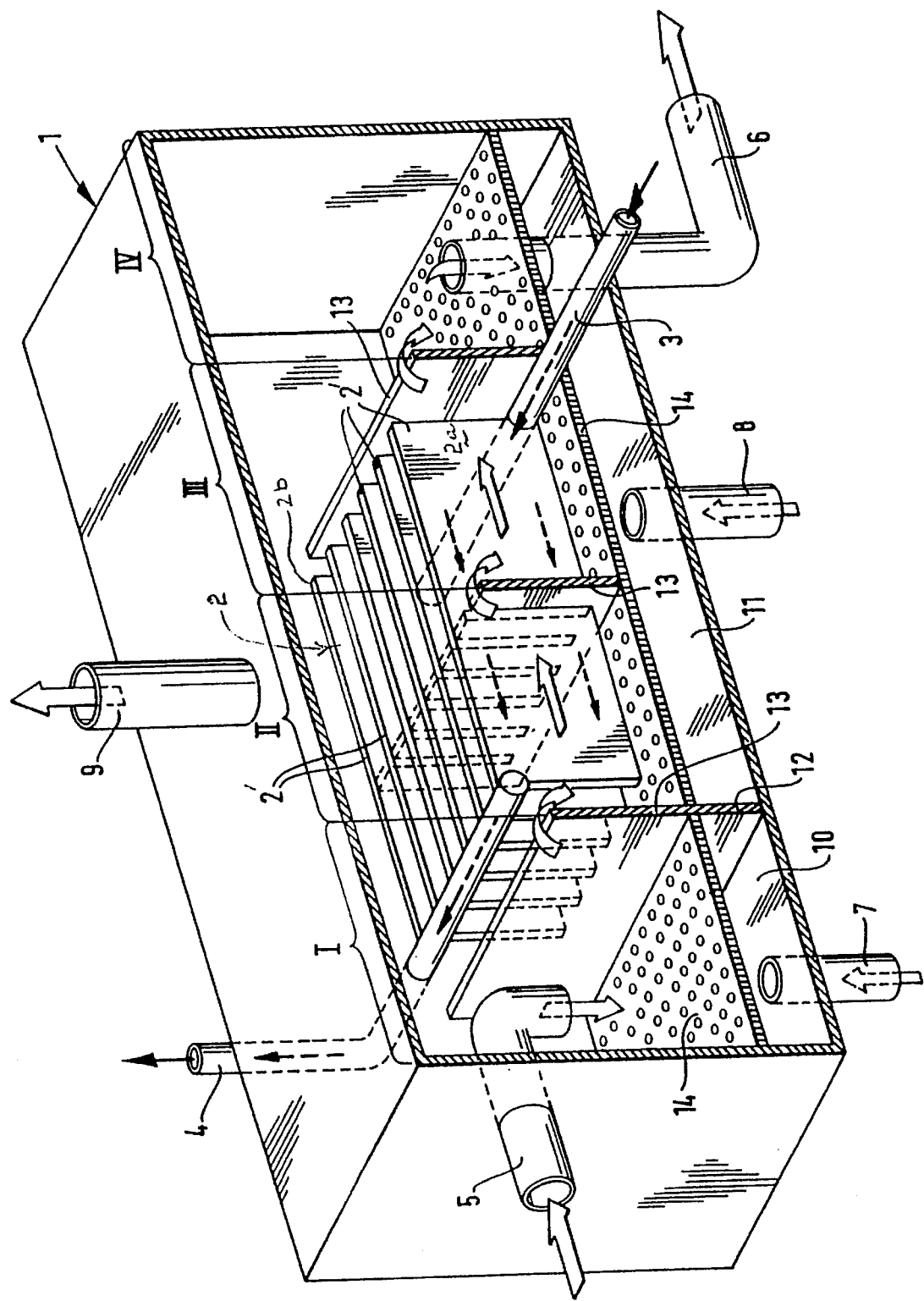

METHOD FOR PRODUCING SODIUM PERBORATE MONOHYDRATE

This application is a continuation of application Ser. No. 08/240,317, filed May 10, 1994, abandoned.

FIELD OF THE INVENTION

This invention relates to a method and apparatus for producing sodium perborate monohydrate by dehydrating sodium perborate tetrahydrate in a fluid bed with heated air. The method results in sodium perborate monohydrate with high abrasion resistance.

BACKGROUND OF THE INVENTION

Sodium perborate monohydrate with an active oxygen content of approximately 15 to 16% by weight is becoming increasingly more significant than sodium perborate tetrahydrate as a bleaching component in detergents and cleaning agents on account of its higher active oxygen content and higher rate of dissolution.

Sodium perborate monohydrate can be produced, as has already been taught by French patent 1,081,421, by dehydrating sodium perborate tetrahydrate by means of a heated current of air while maintaining the material to be dehydrated in a fluidized state. A disadvantage of this method is the low abrasion resistance of the product produced, which low abrasion resistance results in problems in handling, especially in pneumatic transport.

Attempts have been made to adjust the conditions during the dehydration in an effort to obtain monohydrate with an elevated abrasion resistance.

According to the method described in DE-OS 19 30 286, heated air with a temperature of 180° to 210° C. is supplied to the fluid-bed dryer and the exhaust air temperature maintained at a constant value. The high temperatures used in the DE-OS 19 30 286 process create problems such as the formation of agglomerates and a loss of active oxygen. In addition, the abrasion resistance of the monohydrate obtained in the DE-OS 19 30 286 process no longer meets the current requirements being made in the industry.

DE patent 22 58 319 teaches an improved dehydration method wherein a relative humidity of 40 to 80% is maintained in the air surrounding the crystalline grains and the temperature of the exhaust air is adjusted to at least 60° C. in order that a melting start is achieved. The required moisture is adjusted by feeding in vapor (e.g., steam) to the drying air. Alternatively, according to patent of addition DE 24 44 780 the relative air humidity can also be produced by evaporating water of crystallization, which, however, considerably lengthens the time for the dehydration, so that the process takes longer and the yield decreases for a given time period.

According to the discussion in EP-B 0,194,952, the two-stage design and the formation and the discharge of dust in the two previously mentioned methods are disadvantageous. It is asserted in the EP-B 0,194,952 reference that instead of the two-step design it is advantageous to use a one-stage method with an air entry temperature of 100° to 180° C., a fluid-bed temperature of 65° to 80° C. and a relative air humidity in the fluid bed of 10 to 40%. For the dehydration of tetrahydrate on a production scale, the method of EP-B 0,194,952 is limited to the use of a cylindrical fluid-bed dryer. Because of the low admissible flow speed of the drying air and the low admissible moisture associated with this type of dryer, only a low speed, large volume mass current of drying air (and the drying energy provided by the drying air) can be charged into the fluid bed. Hence, only a low production throughput is possible with a system like that of EP-B 0,194,952.

SUMMARY OF THE INVENTION

The invention is directed at avoiding the aforementioned problems associated with the prior art systems and providing an improved method for the production of sodium perborate monohydrate with high abrasion resistance through dehydration of sodium perborate tetrahydrate in a fluid bed with the use of heated air. In addition, the method of the present invention is smoothly integratable into the customary systems used in the industry (e.g., channel-shaped flow-bed dryers). Moreover, the present invention is advantageous from the standpoint of energy efficiency when compared with the traditional manner of operation. The method of the invention is carried out in an advantageously designed dryer which produces an improved sodium perborate monohydrate.

The present invention provides a method for producing sodium perborate monohydrate by means of dehydrating sodium perborate tetrahydrate in a fluid bed with heated air in which the temperature of the air entering into the fluid bed is between 80° and 220° C. and the temperature of the fluid bed is between 40° and 90° C. The present invention is also characterized in that contact surfaces are provided within the fluid bed which contact surfaces provide a total area of contact that is 1–500 times the area of the fluidizing plate of those zones of the fluidized bed apparatus where said contact surfaces are installed. More preferably, the total area of the contact surfaces is 2–100 times and, even more preferably, 2 to 20 times the area of the fluidizing plate of those zones of the fluidized bed apparatus where said contact surfaces are installed.

The fluid-bed device can be designed to be cylindrical or longitudinally extended; that is, for example, in the shape of a circular cross-sectioned conduit, a square or rectangular cross-sectioned housing, or a housing defined by a longitudinally elongated channel of any cross-sectional shape. The fluid bed device can also comprise one or several stages or zones. Channel-shaped fluid-bed devices, preferably subdivided into several zones, are preferred. The several zones are advantageously separated from each other by weirs. The zones can be supplied with a single or preferably at least two separate air supplies which supply drying air/fluidizing air. The temperature of the air supplied to the different zones can be different. It is advantageous to maintain the temperature of the air supplied to the first zone, into which the tetrahydrate is also usually first introduced, below that of the air supplied to the following zones. Preferably, the temperature of the air supplied to the first zone is 40° to 80° C. below the air supplied to the following zone or zones.

The aforementioned contact surfaces are advantageously designed as heat exchangers, preferably as plate-shaped heat exchangers. A heat transfer medium preferably flows through a plurality of chambers with flat plate exterior surfaces which chambers together form the flat plate heat exchanger or exchangers. The entry temperature of the medium is generally in a range between 70° and 140° C., more preferably 80° to 130° C. and even more preferably 100° to 130° C. The exit temperature of the medium is generally 5° to 30° C. below the entry temperature. The entry temperature and the flow rate of the heat transfer medium are advantageously selected in such a manner that a surface temperature of the heat-exchanger surfaces of below 120° C., preferably 90° to 110° C., is maintained. It is further preferable to avoid having a surface temperature exceed 110° C., particularly in the supply area and in zones which still have a high amount of perborate tetrahydrate since otherwise caking of the perborate cannot be excluded.

The plate-shaped contact surfaces or heat exchangers are arranged as to be essentially vertical and transversely orientated with respect to the horizontal approach-flow bottom, and, in channel-shaped flow-bed dryers, the plates are also arranged essentially parallel to the longitudinal direction of the channel. The concept "essentially" also includes other arrangements such as inclined and zigzag arrangements in as far as a product backup or accumulation, or an undesirable deposit of product does not occur on inclined parts of the heat exchanger. Also, the "approach-flow bottom" underlying the contact surfaces is preferably comprised of either a single fluidizing plate through which fluidizing air is pumped or a plurality of individual plate sections which together define the "fluidizing plate". Any weirs added to define different zones can be placed above the single plate or each zone can have its own fluidizing plate section. The contact surface plates can be so close to each other in the fluid-bed dryer that a fluid bed can be maintained between the contact surface plates. It is also possible, in order to increase the contact surface, to use structured or surfaced plates and/or additional cross pieces between individual plates to the extent that the flow of perborate material is not disadvantageously hindered by such modifications in the design.

Sodium perborate tetrahydrate is charged into the channel-shaped fluid-bed dryer at the one end and sodium perborate monohydrate is removed at the other end and supplied to a customary cooler. Even the cooler can advantageously be a fluid-bed cooler with built-in contact surfaces.

According to a preferred embodiment it is advantageous if no contact surfaces are arranged in the area of the infeed position of the sodium perborate tetrahydrate into the fluid-bed dryer since the danger of caking of perborate tetrahydrate or partially dewatered perborate tetrahydrate is greater at this location. For instance, it is preferable to have a heat exchanger positioned in the second or additional zones, but not in the first zone. Furthermore, the caking danger is further avoided if the temperature conditions in the infeed area, which is preferably designed as the first zone and comprises a separate dryer air supply, as well as the amount of dryer air and perborate tetrahydrate supplied to this first zone are coordinated in such a manner that essentially only a thin casing layer of perborate monohydrate forms about a nucleus of perborate tetrahydrate in the area of this zone.

It is advantageous to adjust the temperature of the air supplied to the first zone to 100° to 140° C., and more preferably, 110° to 130° C. The monohydrate casing layer prevents the caking of particles on the contact surfaces of the following zones, at which time melting processes are believed likely to occur within the particles and which melting processes are believed to contribute significantly to the obtention of a high abrasion resistance and of a high fracture strength of the sodium perborate monohydrate produced.

As noted, a preferred embodiment of the invention is one where a single or several heat exchangers are located in the zone or zones of a channel-shaped fluid-bed dryer following the zone of addition in which the perborate is first introduced. Dryer air is supplied to the zone or zones downstream from the zone of addition via a common or several separate supply means. The heat transfer medium can be conducted in a concurrent flow but preferably the medium is in a counterflow relationship with respect to the direction of flow of the perborate to be dehydrated. The entry temperature of the heat transfer medium is preferably in a range between approximately 100° C. and approximately 130° C. The exit temperature is customarily 5° to 30° C. below the entry temperature. The surface temperature of the heat exchangers is preferably maintained below 110° C. since caking of the perborate can otherwise occur given the countercurrent guidance. For improved energy efficiency, the greatest possible temperature difference between the entry and the exit temperature of the medium is striven for.

The supply air temperature in the second and, if required, in the following zones is advantageously in a range of 140° to 190° C., especially between 160° and 190° C. The temperature of the fluid bed in the first zone is below the melting point of sodium perborate tetrahydrate, in general around 50° C., and in the following zones around and above the melting point, that is, around 60° C. and above up to approximately 90° C. If separate fluidizing air conduits are used in a plurality of zones downstream from the first zone it is also possible to gradually increase the temperature of the drying air in stepped fashion within the above-described temperature range. In addition, the heat exchanger or heat exchangers can be designed so as to facilitate the temperature differential across the different zones.

It was found that in the dehydration of sodium perborate tetrahydrate, the abrasion resistance of the sodium perborate monohydrate is surprisingly increased by the use of the contact surfaces of the invention. The contact surfaces can be in a plurality of forms, such as pipes, tubes or plates, with the latter being preferred, and can be positioned in one or several dryer zones of a fluid bed device. At the same time energy efficiency is improved as a consequence of a reduced flow rate of the air, reduced back-mixing and reduced bubble losses.

The designing of the contact surfaces as heat exchangers further increases, to an unexpected extent, both the energy advantages as well as the quality as regards the abrasion resistance according to ISO 5937, which is incorporated herein by reference. In addition, the fracture strength (ball mill test) of the resultant product of the invention is also improved. Further, the amount of hot supply air can be reduced to a minimum value necessary for fluidization with the same dryer performance by means of the particle-convective thermal charging on contact surfaces. This reduces the exhaust air losses. Furthermore, since the dust content in the exhaust air is low on account of the reduced air velocity, a part of the exhaust air can be recycled, resulting in further savings.

Since a part of the heat required for the dehydration of the tetrahydrate is transferred via the heat exchangers onto the product, the temperature of the hot supply air can be lowered somewhat, which increases the operating safety since a melting of the tetrahydrate as a consequence of too-high bottom temperatures no longer occurs.

It is known—see the brochure Sulzer Escher Wyss "Fliessbett-Technik" or "Fluid Bed Technology" (23.0831 RHhe 15), pages 2 and 8—that fluid bed dryers with built-in heat exchangers can be used for the indirect supply of heat at a low temperature level for drying sodium perborate. However, no suggestion can be gathered from this document for converting sodium perborate tetrahydrate into sodium perborate monohydrate. It is believed by the Applicants that there was reluctance in the industry to use such a system like that described in the above brochure, mainly on account of the low melting point of sodium perborate tetrahydrate (approximately 64° C.) and the belief that caking problems would occur on the heat exchangers. It could not have been foreseen that such cakings do not occur if a) the tetrahydrate is conducted to the fluid bed dryer in such a manner that the particles already exhibit a thin monohydrate casing prior to the contact with the contact surfaces, and b) a surface temperature of the contact surfaces of 110° C. is not exceeded in the area of the particles still consisting primarily of tetrahydrate. Surprisingly, an extraordinary effect is achieved under the cited conditions, to wit, the abrasion resistance is significantly increased.

BRIEF DESCRIPTION OF A PREFERRED EMBODIMENT

An especially advantageous embodiment of the method of the invention follows from the FIGURE'S schematic presentation of a fluid bed, boiling bed dryer in the FIGURE.

DETAILED DESCRIPTION OF THE PREFERRED EMBODIMENT

As shown in the FIGURE, fluid bed, boiling bed dryer 1 comprises four zones of which zone I serves for the superficial monohydrate formation (pre-drying) and zones II to IV for the actual dehydration (main drying). A plate-shaped heat exchanger 2 is located in zones II and III and has contact surfaces 2' that are oriented parallel to the air flow (bottom to top) and to the product flow (left to right). The liquid heating medium for the heat exchanger is shown as flowing in a countercurrent direction to the product flow from the inlet of the heating medium at 3 to the outlet at 4. In the embodiment shown in the FIGURE, heat exchanger 2 comprises rectangular, thin width chambers that are vertically oriented and elongated in the direction of flow of the perborate. Each chamber includes two major surfaces 2a separated from each other by a thin edging strip 2b which makes the chamber fluid tight except for an inlet port at the inlet pipe/chamber interface and an outlet port at the outlet pipe/chamber interface. In this way, the heat exchanger's fluid medium (e.g., oil) passes through inlet 3, through a channel or channels provided in each chamber and then out of outlet 4. The distance between each contact surface or, in other words, the width of the space formed between contact surfaces of adjacent chambers is preferably 10 to 50 mm. The number and the surface area of each contact wall (chamber wall) is dependent on the shape of the channel formed in the fluid bed device. Each chamber is maintained in a suspended state with respect to the top of housing 1 and fluidizing plate 14 and extends through essentially all of zones II and III.

In the embodiment shown in the FIGURE there are six chambers whose major surface areas or contact surfaces total about 1.2 m² in area (each major contact surface having a longitudinal length of 1 m and a vertical height of 0.1 m). The chambers of FIG. 1 also have an edge thickness of 4 cm. The major surface areas are parallel to each other as well as to the sidewalls of dryer 1. A preferred spacing distance is from 1 to 5 cm. A suitable material for the chambers and the inlet pipes is stainless steel.

The contact surfaces can be heated in other ways such as, for example, through the use of small resistance heaters within the chambers or by way of convection through solid plates. Tetrahydrate is supplied via line 5 to zone I free of any heat exchanger. Monohydrate is removed on the other end of the dryer from zone IV via line 6 and cooled in a cooler (not shown). Zone I and zones II to IV comprise separate air entrances 7 and 8 so that the pre-drying and the main drying can be carried out at different air temperatures—lower temperature in the pre-drying zone. The air exiting from the top of zones I to IV is removed in common via line 9 and supplied to dedusting means (not shown) and, if required, to partial recycling means. The air receiver 10 is positioned under the section of the fluidizing plate 14 in zone I and is separated from air receiver 11 of zones II to IV by sheet 12. Weirs 13 are located between the individual zones. A sheet with holes formed therein serves as the fluidizing plate of the fluid bed apparatus (e.g., boiling bed dryer 1). This sheet with holes has a pressure loss of approximately between 300 and 1000 Pa. In the FIGURE three weirs 13 are illustrated. The leftmost weir shown in the FIGURE preferably extends about ½ to ¾ of the height of the dryer above the fluidizing plate. The sodium perborate tetrahydrate is directed downward from conduit 5 into the upwardly directed drying air in zone I which is separated from zone II by weir 13. The fluidized product is then passed into zone II by flowing over the upper edge of the leftmost weir 13.

The fluidized product then passes between contact surfaces 2' following passage through a brief clearance between leftmost weir 13 and the leftmost edge of contact surfaces 2'. The plates forming contact surfaces 2' are intermediately supported by the intermediate weir 13 within slots formed in the intermediate weir. The fluidized product flows over the upper edge of intermediate weir 13 (whose height is less than that of the leftmost weir). The intermediate weir 13 further differentiates zone II from zone III. The fluid product flows through zone III while in thermal contact with the right half of contact surfaces 2', passes through a brief clearance between the rightmost end of the contact surfaces 2' and the rightmost weir 13, over the upper edge of the rightmost weir 13 and eventually into collection conduit 16 provided at the bottom of zone IV. As illustrated, the rightmost weir has a height similar to the height of the intermediate weir 13 and both the rightmost and intermediate weir do not extend below fluidizing plate 14. The leftmost weir does, however, to differentiate the different air receivers below the fluidizing plate.

EXAMPLES 1 TO 7

The following examples illustrate some preferred embodiments of the process and apparatus for carrying out the present invention.

Sodium perborate tetrahydrate (NaPb-th) was converted into sodium perborate monohydrate (NaPb-mh) in a device arranged according to the FIGURE. The approach-flow bottom of the fluid bed dryer (i.e., the fluidizing plate in those zones of the fluidized bed apparatus where the contact surfaces are installed) had an area of 0.3 m². A heat exchanger, comprised of three parallel chambers whose contacting surfaces each had an area of 0.6 m², was arranged in zones II and III. After the adjustment of the mass flow of the supply air with temperature $T_{(I)}$ to zone I and of the massive flow of the supply air with temperature $T_{(II-IV)}$ to zones II–IV with a common air supply, NaPb-th was charged in such an amount that the $O_a$ content of the removed NaPb-mh was about 15%. The NaPb-mh has a theoretical $O_a$ content of 16.03% while commercial products of the present invention have the about 15% $O_a$ content described above. The operating data, the exhaust-air energy loss determined per kg supplied NaPb-th as well as analytic data—active oxygen content ($O_a$), abrasion according to ISO test 5937 and the fragility or brittleness after a ball-mill test (as explained below) of the sodium perborate monohydrate produced follow from the table. The German Company Degussa AG provided the sodium perborate tetrahydrate supplied to the fluid bed apparatus.

Determination of the fragility (%) was based on the so called ball mill test which involves the use of a ball mill formed from stainless steel and having a height of 10 cm, an inner diameter of 11 cm, a speed of 150 rpms, and a time of 6 min. The filling amount of said test was a 50 g specimen and 8 stainless steel balls (Ø=20 mm) were used. The specimen treated in the ball mill and an untreated reference specimen were each sieved for 10 min—sieve with 0.0246 mm opening and 0.053 opening (DIN 4188). The fragility (%) is based on the difference of the sum of the residues of both sieves of non-ground minus ground specimen times 2.

Preferably, the fragility % of the product of the present invention is 3 to 12% and more preferably 3 to 10%. The preferred abrasion % of the product produced in accordance with the invention is preferably 3 to 10% and more preferably 3 to 8%.

TABLE

| Example No. | 1 | 2 | 3 | 4 | 5 | 6 | 7 |
|---|---|---|---|---|---|---|---|
| Supply NaPb-th (kg/h) | 49.0 | 56.7 | 55.6 | 40.8 | 43.1 | 45.1 | 40.1 |
| Supply air zone I(kg/h) | 129 | 129 | 129 | 129 | 129 | 129 | 129 |
| Temp. air zone I (kg/h) (°C.) | 126 | 128 | 125 | 128 | 122 | 123 | 123 |
| Supply air zone II–IV (kg/h) | 322 | 568 | 413 | 374 | 271 | 264 | 277 |
| Temp. air zone II–IV (kg/h) (°C.) | 180 | 182 | 180 | 180 | 183 | 187 | 159 |
| WT-oil: Amount (kg/h) | 570 | — | 528 | — | 372 | 576 | 570 |
| WT-oil: Temp.in (°C.) | 118 | — | 120 | — | 127 | 116 | 115 |
| WT-oil: Temp.out (°C.) | 100 | — | 102 | — | 103 | 98 | 98 |
| Temp. Fluid bed | | | | | | | |
| Zone I(°C.) | 55 | 53 | 50 | 49 | 46 | 45 | 46 |
| Zone II(°C.) | 73 | 72 | 60 | 57 | 60 | 58 | 57 |
| Zone III(°C.) | 70 | 65 | 66 | 61 | 66 | 63 | 63 |
| Zone IV(°C.) | 72 | 79 | 75 | 75 | 76 | 76 | 77 |
| Exhaust air energy losses | | | | | | | |
| (kJ/kg NaPb-th) NaPb-mh | 287 | 420 | 314 | 359 | 280 | 263 | 305 |
| $O_{a\,(\%)}$ | 15.6 | 15.4 | 15.5 | 15.4 | 15.0 | 15.1 | 15.3 |
| Abrasion (ISO) (%) | 5.1 | nb | 5.3 | 5.3 | 4.7 | 4.3 | 4.8 |
| fragility (KM) (%) | 6.2 | nb | 8.0 | 8.1 | 5.7 | 5.5 | 5.8 |

Reference Examples 1 and 2

Sodium perborate tetrahydrate was dehydrated to the monohydrate in the channel or conduit-shaped fluid bed dryer with four zones used in accordance with the above example but without the contact surfaces in accordance with the invention.

| | VB 1 | VB 2 |
|---|---|---|
| Supply NaPb-th: | 48.9 kg/h | 32 kg/h |
| Supply air to zone I | | |
| Temperature: | 123° C. | 125° C. |
| Amount: | 533 kg/h | 286 kg/h |
| Supply air to zones II–IV | | |
| Temperature: | 179° C. | 183° C. |
| Amount: | 179 kg/h | 129 kg/h |
| Fluid bed | | |

| | VB 1 | VB 2 |
|---|---|---|
| temperature zone I: | 59° C. | 55° C. |
| temperature zone II: | 61° C. | 61° C. |
| temperature zone III: | 67° C. | 64° C. |
| temperature zone IV: | 97° C. | 76° C. |
| Exhaust air energy loss (kJ/kg NaPb-the): | 544 | 430 |
| NaPb-mh | | |
| $O_a$: | 15.2% | 15.4% |
| Abrasion (ISO 5937): | 14.1% | 14.2% |
| Fragility-KM test: | 18.0% | 15.9% |

It is apparent upon a comparison of the examples in accordance with the invention with the reference examples that the method of the invention results in an NaPb-mh with considerably greater abrasion resistance. In addition, the exhaust air energy losses are already distinctly reduced if an unheated heat exchanger acting only as a contact surface is arranged in the fluid bed—cf. e.g., example 2 with reference example 1 or example 4 with reference example 2. A further reduction of the overall energy loss is achieved by the heating of the contact surfaces, cf. e.g., examples 2 with reference example 1 or 4 with reference example 5.

Although the present invention has been described with reference to the preferred embodiments, the invention is not limited to the details thereof. Various substitutions and modifications will occur to those of ordinary skill in the art and also substitutions and modifications are intended to fall within the spirit and scope of the invention as defined in the appended claims.

German Patent Application P 4316320.3 is incorporated herein by reference.

What is claimed is:

1. A method of producing sodium perborate monohydrate by dehydrating sodium tetrahydrate in a fluid bed with heated air which comprises:

introducing heated air so as to form a fluid bed with the heated air being between 80° and 220° C. and the temperature of the fluid bed being between 40° and 90° C.; and introducing sodium perborate tetrahydrate into the fluid bed and passing the heated air and sodium perborate tetrahydrate by contact surfaces arranged within the fluid bed such that the sodium perborate tetrahydrate is dehydrated to form sodium perborate monohydrate, and wherein the fluid bed has a first and a second temperature zone formed between an inlet and an outlet location of said perborate, and said first zone being cooler than said second zone such that in the first zone the introduced perborate is transformed so as to have a layer of sodium perborate monohydrate surrounding a thicker nucleus of sodium perborate tetrahydrate.

2. The method according to claim 1, wherein said contact surfaces are plate shaped contact surfaces whose total area is 2 to 100 times the area of a fluidizing plate underlying said contact surfaces, and said plate shaped contact surfaces are orientated essentially vertically with respect to a horizontally orientated approach-flow bottom.

3. The method according to claim 1, wherein a plate-shaped heat exchanger is used to provide said contact surfaces.

4. The method according to claim 3, further comprising passing a liquid heat transfer medium through said heat exchanger, said medium having an entry temperature in a range of 70° to 140° C. and the entry temperature and the flow rate of the heat transfer medium being selected so that a temperature of 90° to 110° C. is maintained on a contact surface of the heat exchanger.

5. The method according to claim 1, wherein dehydration is carried out in a longitudinally extended, single- to multizone fluid bed dryer with said contact surfaces spaced at least within one zone of said dryer.

6. The method according to claim 5, wherein no contact surfaces are arranged in an area or zone of infeed of the sodium perborate tetrahydrate into the fluid bed or in an area wherein the supplied sodium perborate tetrahydrate still does not exhibit any sodium perborate monohydrate casing layer.

7. The method according to claim 5, wherein a plate shaped heat exchanger is used to provide said contact surfaces, and said method further comprising supplying a liquid heat transfer medium to the heat exchanger arranged in at least one zone of the fluid bed in a countercurrent direction to the direction of flow of the perborate to be dehydrated and such that the temperature of the surface of the heat exchanger is maintained in a range of 90° to 110° C.

8. The method according to claim 5, characterized in that the dehydration is carried out in a longitudinally elongated flow-bed dryer with a first and second zone, said flow-bed dryer being equipped with at least one plate-shaped heat exchanger whose plates are aligned essentially vertically with respect to a horizontally orientated approach-flow bottom and parallel to the longitudinal direction of the dryer, and said first zone, which is free of contact surfaces, is supplied with drying air with a supply air temperature of 100° to 140° C. and the second zone is supplied with drying air with a supply air temperature of 140° to 190° C.

9. A method as recited in claim 1, wherein said approach-flow bottom includes at least one fluidizing plate and said contact surfaces are plate-shaped contact surfaces having a combined total area that is 1–500 times the fluidizing plate area.

10. A method as recited in claim 1, wherein said fluid bed is formed in a longitudinally elongated flow-bed dryer with a first zone and a plurality of downstream zones, said contact surfaces being positioned solely within said downstream zones, and said sodium perborate tetrahydrate being fed first into said first zone free of any contact surfaces and then into said downstream zones, and the temperature of the gas supplied to said first zone being fed at a temperature cooler than the supply temperature of the gas being fed to the downstream zones.

11. A method as recited in claim 1, wherein said fluid bed is formed in a longitudinally extending flow bed dryer with an inlet end and an outlet end, and said dryer having at least two zones spaced between said inlet and outlet ends that are separated by a weir, said sodium perborate tetrahydrate being fed through the inlet end to said first zone which is free of any contact surfaces and directed over an upper edge of the weir into a second zone which includes said contact surfaces, and said first zone being fed with heated air maintained at a lower temperature than the heated air being fed into the second zone.

12. A method as recited in claim 1, wherein said contact surfaces are heated to a temperature of 90° to 110° C.

13. A method of producing sodium perborate monohydrate by dehydrating sodium perborate tetrahydrate in a fluid bed with heated air which comprises:

introducing heated air so as to form a fluid bed with the heated air being between 80° and 220° C. and the temperature of the fluid bed being between 40° and 90° C.; and introducing sodium perborate tetrahydrate into the fluid bed and passing the heated air and sodium perborate tetrahydrate by contact surfaces arranged within the fluid bed such that the sodium perborate tetrahydrate is dehydrated to form sodium perborate monohydrate, and wherein dehydration is carried out in a longitudinally extended, single-to-multi zone fluid bed dryer with said contact surfaces spaced at least within one zone of said dryer and wherein no contact surfaces are arranged in an area or zone of infeed of the sodium perborate tetrahydrate into the fluid bed or in an area wherein the supplied sodium perborate tetrahydrate still does not exhibit any sodium perborate monohydrate casing layer.

14. A method as recited in claim 13, wherein the fluid bed has a first and a second temperature zone formed between an inlet and an outlet location of said perborate, and said first zone being cooler than said second zone such that in the first zone the introduced perborate is transformed so as to have a layer of sodium perborate monohydrate surrounding a thicker nucleus of sodium perborate tetrahydrate.

15. The method according to claim 13, wherein said contact surfaces form a part of a heat exchanger and said method further comprising supplying a heat transfer medium to the heat exchanger arranged in at least one zone of the fluid bed such that the temperature of said contact surfaces is maintained in a range of 90° to 110° C.

16. A method according to claim 13, wherein dehydration is carried out in a longitudinally elongated flow-bed dryer with at least a first and a second zone, said flow-bed dryer being equipped with at least one plate-shaped heat exchanger whose plates provide the contact surfaces such that the contact surfaces are aligned essentially vertically with respect to a horizontally orientated approach-flow bottom and parallel to the longitudinal direction of the dryer, and said first zone, which is free of contact surfaces, is supplied with drying air with a supply air temperature of 100° to 140° C. and the second zone is supplied with drying air with a supply air temperature of 140° to 190° C.

17. A method as recited in claim 13, wherein said fluid bed is formed in a longitudinally elongated flow-bed dryer with a first zone and a plurality of downstream zones, said contact surfaces being positioned solely within said downstream zones, and said sodium perborate tetrayhydrate being fed first into said first zone free of any contact surfaces and then into said downstream zones, and the temperature of the air supplied to said first zone being fed at a temperature cooler than the supplied temperature of the air being fed to the downstream zones.

18. A method of producing sodium perborate monohydrate by dehydrating sodium perborate tetrahydrate in a fluid bed with heated air which comprises:

introducing heated air so as to form a fluid bed with the heated air being between 80° and 220° C. and the temperature of the fluid bed being between 40° and 90° C.; and introducing sodium perborate tetrahydrate into the fluid bed and passing the heated air and sodium perborate tetrahydrate by contact surfaces arranged within the fluid bed such that the sodium perborate tetrahydrate is dehydrated to form sodium perborate monohydrate, and wherein said contact surfaces are heated to a temperature of 90° to 110° C., and wherein the contact surfaces are positioned sufficiently downstream from a sodium perborate tetrahydrate infeed area of said fluid bed such that said contact surfaces contact said perborate after said sodium perborate tetrahydrate exhibits an outer casing layer of sodium perborate monohydrate.

19. A method as recited in claim 18 wherein said contact surfaces from part of a heat exchanger, and said method further comprising supplying a heat transfer medium to said heat exchanger.

20. A method according to claim 18, wherein dehydration is carried out in a longitudinally elongated flow-bed dryer with at least a first and a second zone, said flow-bed dryer being equipped with at least one plate-shaped heat exchanger whose plates provide the contact surfaces such that the contact surfaces are aligned essentially vertically with respect to a horizontally orientated approach-flow bottom and parallel to the longitudinal direction of the dryer, and said first zone, which is free of contact surfaces, is supplied with drying air with a supply air temperature of 100° to 140° C. and the second zone is supplied with drying air with a supply air temperature of 140° to 190° C.

* * * * *